United States Patent
Aley

(10) Patent No.: US 7,673,584 B2
(45) Date of Patent: Mar. 9, 2010

(54) VERTICAL PET EXCREMENT COLLECTION DEVICE

(76) Inventor: Thomas E. Aley, 2109 Luray Ave., Cincinnati, OH (US) 45206

( * ) Notice: Subject to any disclaimer, the term of this patent is extended or adjusted under 35 U.S.C. 154(b) by 113 days.

(21) Appl. No.: 11/700,419

(22) Filed: Jan. 31, 2007

(65) Prior Publication Data

US 2008/0178818 A1      Jul. 31, 2008

(51) Int. Cl.
*A01K 1/035* (2006.01)

(52) U.S. Cl. .................. 119/161; 160/135; 160/353; 160/377

(58) Field of Classification Search ......... 119/168–173, 119/161, 165, 166, 167, 162; D30/161; 256/12.5, 256/24, 23; 40/604; 160/135, 351, 353, 160/377, 378, 380; 49/384; 220/731
See application file for complete search history.

(56) References Cited

U.S. PATENT DOCUMENTS

| | | | | | |
|---|---|---|---|---|---|
| 1,773,141 | A | * | 8/1930 | Hodgson | 119/165 |
| 2,210,652 | A | * | 8/1940 | Dennett | 160/231.1 |
| 3,086,626 | A | * | 4/1963 | Bowers | 52/204.599 |
| 3,962,827 | A | * | 6/1976 | Chaffee | 49/384 |
| 4,523,745 | A | * | 6/1985 | Killman et al. | 256/1 |
| 4,576,364 | A | * | 3/1986 | O'Fearna | 256/24 |
| 4,819,580 | A | * | 4/1989 | Foldes | 119/170 |
| 4,830,080 | A | * | 5/1989 | Densen | 160/135 |
| 4,951,605 | A | * | 8/1990 | Brown | 119/165 |
| D328,529 | S | * | 8/1992 | Lenarczyk | D6/329 |
| 5,134,974 | A | * | 8/1992 | Houser | 119/168 |
| 5,758,868 | A | * | 6/1998 | Shea | 256/12.5 |
| 5,890,782 | A | * | 4/1999 | Alberts | 312/196 |
| 6,129,050 | A | * | 10/2000 | Carbajal | 119/165 |
| 2006/0102084 | A1 | * | 5/2006 | Garfield | 119/165 |
| 2007/0084413 | A1 | * | 4/2007 | Oertel et al. | 119/165 |
| 2007/0169707 | A1 | * | 7/2007 | van Zuilekom | 119/169 |
| 2008/0060585 | A1 | * | 3/2008 | Garfield | 119/165 |

FOREIGN PATENT DOCUMENTS

GB      2 150 966 A    *    7/1985

* cited by examiner

*Primary Examiner*—Rob Swiatek
(74) *Attorney, Agent, or Firm*—R. Christian Macke

(57) ABSTRACT

A vertical pet excrement collection device. The device is an absorbent fabric collecting sheet mounted on a frame and maintained in a substantially vertical orientation to catch pet excrement emitted that would not land on or be absorbed by a horizontal collection device. In one embodiment, the device is incorporated with and connected to an existing horizontal collection device such as a litterbox. In a second embodiment the collection device is a frame on which an absorbent sheet is mounted, the frame having an interconnected horizontal frame and vertical frame defining a horizontal pad and a vertical pad. Simple and quick removal and replacement of the absorbent material is provided so that a solid sheet may be easily replaced.

7 Claims, 4 Drawing Sheets

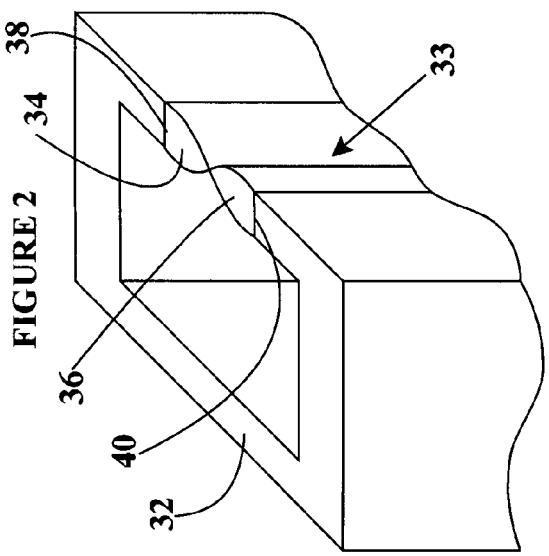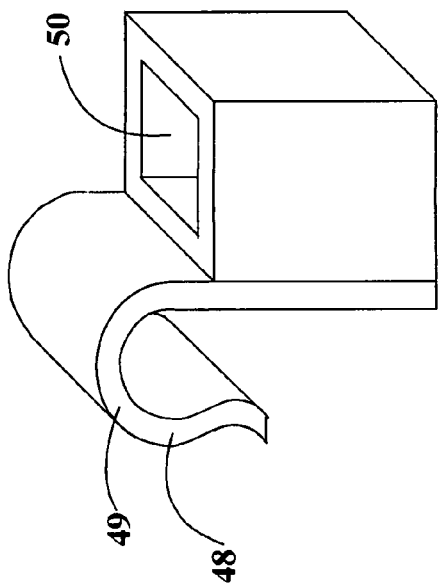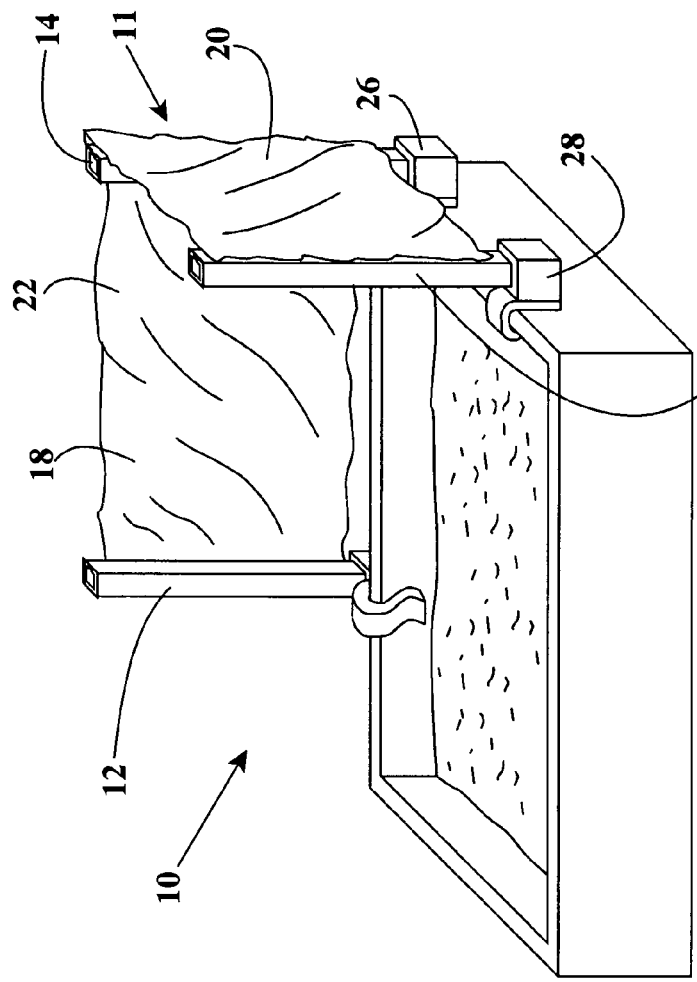

VERTICAL PET EXCREMENT COLLECTION DEVICE

FIELD OF THE INVENTION

This invention relates to a system for holding a vertical absorbent pad which absorbs the excrement of a pet.

BACKGROUND OF THE INVENTION

The use of absorbent pads by pet owners to train their pets or to otherwise provide a sanitary location for pets to relieve themselves is well known. The prior art use of such pads, however, has been limited to applications resembling putting paper down for a dog, providing a litter box for a cat in such a way that absorbent devices lay flat on the ground and are designed to catch and absorb pet excrement that would otherwise wind up on the floor.

Many prior art devices have been proposed to aid in the collection of pet excrement or the housebreaking of pets. Generally it is an objective to get the pets to urinate and defecate at a single location on a disposable, absorbent material. The most common approach has been the use of newspapers laid on the floor for a dog to urinate and defecate on. Although newspapers are absorbent, to some extent, alone they are uncontained and easily scattered by a playful or destructive dog. Also, newspapers used in this way are disadvantageous because the pet excrement leaks through to the floor surface upon which it is laid.

Many of the prior art arrangements are concerned primarily with ways and means to secure the horizontal excrement catching device in place to prevent the movement or scattering of the catching device. One such arrangement is a housing made of a rigid plastic material that has a bottom surface that rests on the floor. Short sidewalls extend upwardly from the bottom surface, a disposable pad being placed in the housing on the bottom surface. The pad extends up and over the top of the sidewalls and a rectangular plastic rim is then positioned on top of the pad draped over the sidewalls to hold the pad in place. In this prior art system, removal of the pad for disposal is relatively easy but it has substantial disadvantages. First, the system is costly as a result of the manufacture of custom pads and frames to fit one another. In addition, this prior art device does not always securely hold the pad. Because only the weight of the frame is holding the periphery of the pad, if a pet were to scratch on the pad with its claws, it is possible that the periphery of the pad would become disengaged from between the frame and sidewalls of the tray. Finally, and most significantly disadvantageous compared to the present invention, this prior art system is essentially a horizontal pad and does not provide adequate any vertical absorbent sheet or pad to catch pet excrement such as that emitted by male dogs when raising their legs or cats which "spray".

To address the problem of securing the horizontal pad, another prior art system utilizes latches to secure the frame to the tray, the portion of the pad extending over the tray sidewalls thus being secured there between. While the frame and pad are more well secured, the addition of the clamps adds significantly to the cost of the system, is time consuming to unlatch the numerous latches, and provides a mechanical component part which is susceptible to breakage. In addition, there is no teaching or suggestion to extend the sidewalls vertically upward to catch excrement emitted from male dogs or cats that will not land on the horizontal pad.

A large number of prior art pet excrement catching devices provide specific methods and devices to secure an absorbent pad to a frame, as discussed above. In U.S. Pat. Nos. 5,630, 376; 6,550,423 and 6,059,247 devices are set forth that provide a perimeter around the absorbent pad and means for securing the pad thereto. In those references the pad is sandwiched by perimeter structure members.

In U.S. Pat. No. 6,450,119, a system for holding a pad is provided in which the pad is secured at the corners by being stuffed into and retained in a plastic disk having radially extending cuts.

In none of the prior art devices is there provided or suggested the need for a vertical extension to the absorbent pad. As a result, the prior art does not recognize the problem or provide a solution for the pet excrement emitted, for example, by male dogs raising their legs or cat spray, even if they do so while standing on the horizontal absorbent device or a box of kitty litter.

There is identified a need for a vertical pet excrement collection device. It is advantageous to provide such a vertical device in at least two embodiments, the first having a frame and being incorporated with and connected to a horizontal collection device. The second embodiment is a vertical collection device that has attachment provisions for securing to an existing horizontal collection device, such as a box or tray holding kitty litter.

The vertical pet excrement collection device identified comprises a sheet of absorbent material held vertically by a frame, with provisions built into the frame for securing the sheet to the frame. Simple and quick removal and replacement of the sheet of absorbent material is provided so that it may be easily replaced.

OBJECTS OF THE INVENTION

It is an object of the present invention to provide a device for collecting pet excrement by holding a vertical absorbent sheet which is simple and easily manufactured.

It is another object of the present invention to provide a device which securely holds an absorbent sheet vertically while also providing simple and quick means for removing and replacing the absorbent sheet.

It is yet another object of the present invention to provide a device for holding an absorbent sheet vertically having a frame and means for releasably securing the absorbent sheet to the frame.

It is a further object of the present invention to provide a sturdy device for holding an absorbent sheet vertically that is attached to an absorbent horizontal sheet.

It is a further object of the present invention to provide a device having a vertical absorbent sheet and a horizontal absorbent sheet in which an interconnected frame holds both the vertical sheet and horizontal sheet.

It is yet another object of the present invention to provide a device having a vertical absorbent sheet that connects to a generally horizontal, pre-existing pet excrement collection device.

It is another object of the present invention to provide a device holding an absorbent sheet for pet excrement collection in a vertical orientation wherein the absorbent sheet is releasably secured to a frame by gripping provisions built into the frame.

These and other objects and advantages of the present invention will be apparent from a review of the following specification and accompanying drawings.

SUMMARY OF THE INVENTION

The present invention provides a vertical pet excrement collection device having a collecting sheet and a frame holding the collecting sheet in a substantially vertical orientation. A means for releasably securing the collecting sheet to the frame is also provided.

In the most preferred embodiment of the present invention, the collecting sheet comprises absorbent fabric to absorb the pet excrement. Also, the frame comprises at least two vertically extending members and the means for securing comprises releasable gripping means securing the collecting sheet to the at least two vertically extending members.

The means for securing further comprises gripping means affixed to the vertically extending members, specifically mechanical gripping provisions that are built-in to the vertically extending members. In the most preferred embodiment of the invention the gripping means comprise resilient rubber gripping fingers affixed to the vertically extending members. A sheet of material placed in a small gap between the rubber gripping fingers will be held in placed as a result of the frictional resistance of the opposed rubber surfaces of the fingers. The rubber surfaces may alternatively be a series of spaced apart pairs of rubber gripping fingers or strips of rubber extending a length along the vertical members. The rubber gripping fingers may also alternatively overlap or may be spaced apart a small distance, less than the thickness of the collecting sheet such that the sheet does not freely move between the rubber gripping fingers.

The vertically extending members of the frame are of tubular construction and comprise a substantially C-shaped cross section having a gap formed therein. The resilient rubber gripping fingers are affixed to two edges defining the gap, with the gripping fingers used to hold the collecting sheet there between in a substantially vertical orientation.

In the most preferred embodiment of the present invention the means for holding the sheet in a substantially vertical orientation further comprises means for attaching the frame to a horizontal pet collection device such as a litterbox. The means for attaching further comprises clamping means and means for receiving the vertically extending members of the frame. The principles of the present invention contemplate the use of a litterbox as the horizontal pet collection device, and the clamping means comprises spring loaded clamps engaging the litter box. The vertical members of the frame are of substantially tubular construction and the means for receiving the vertical members comprise tubular sleeves.

In a second preferred embodiment, the vertical pet excrement collection device comprises a frame having vertically extending members and horizontal members forming a base. In this second embodiment, the collecting sheet comprises a horizontal area and a vertical area. The frame comprises interconnected horizontal and vertical members of tubular construction which also have substantially C-shaped cross sections having a gap therein and gripping fingers positioned in the gap to hold fabric therein.

BRIEF DESCRIPTION OF THE DRAWINGS

FIG. 1 is a perspective view of a first embodiment of the vertical pet excrement collector device in which the absorbent sheet is secured to a frame that is added to an existing horizontal pet excrement collector device, such as a box of kitty litter.

FIG. 2 is a detail view of the C shaped frame members of the collector device illustrating attachment provisions of the absorbent sheet to the frame members.

FIG. 3 is a detail view of the brackets that secure the vertical members to an existing horizontal excrement collection device, illustrating the means for receiving the vertical members and the clamping means securing the bracket and frame to the horizontal excrement collection device.

DETAILED DESCRIPTION OF THE INVENTION

Figure 4:
FIG. 4 is a perspective view of a second preferred embodiment of the present invention illustrating a horizontal sheet of absorbent fabric and a vertical sheet of absorbent fabric and a frame supporting both.

A preferred embodiment of the vertical pet excrement catcher device 10 of the present invention is depicted in FIG. 1. As shown, the catcher device 10 comprises a frame 11 having at least two and preferably three vertical members 12, 14, 16 and an absorbent fabric sheet 18 which extends around and is affixed to at least two of the vertical members 12, 14, 16. As shown in FIG. 1, the sheet 18 is affixed to the frame 11 at at least the two outer vertical members 12, 16 to hold the sheet 18 in a substantially vertical orientation. The absorbent fabric sheet 18 extends across the three vertical members 12, 14, 16 as shown to define two substantially perpendicular, vertically upright surfaces 20, 22. By constructing the pet excrement catcher device 10 in this way and providing means for affixing it to an existing litter box 30 it serves the useful function of catching pet excrement emitted by a pet in the litterbox 30 that would have otherwise not landed on the horizontal litterbox surface, all without interfering with or obstructing the pet's entry or exit to or from the litterbox 30. While the preferred embodiment depicted in FIG. 1 illustrates the use of three vertical members 12, 14, 16 to define the frame 11 and two perpendicular vertical surfaces 20, 22, it is specifically contemplated that additional vertical members may be employed to create additional vertical surfaces, such as a third surface extending up from a third side of the litterbox 30, and such provisions do not depart from the principles of the present invention.

The three vertical members 12, 14, 16 comprising the frame 11 are shown affixed to the existing horizontal excrement collection device, e.g. the litter box 30, with three brackets 24, 26, 28. The details of these brackets 24, 26, 28 are shown in FIG. 3. The vertical members 12, 14, 16 are received in and securely held by the brackets 24, 26, 28 as shown in FIG. 1. In the preferred embodiment shown in FIG. 2, each vertical member 12, 14, 16 is substantially of tubular construction and has a C-shaped cross section 32 with a gap 33 formed between two edges 38, 40 of the C-shaped cross section 32. In this preferred embodiment, opposed rubber fingers 34, 36 are affixed to the two edges 38, 40 and cooperate to pinch the sheet 18 between them and hold it in place in the vertical members 12, 14, 16. The rubber fingers 34, 36 are resilient and provide a releasable gripping means securing the sheet 18 to the vertical members 12, 14, 16. While the preferred embodiment reflected in FIG. 2 illustrates the use of the resilient rubber gripping fingers 34, 36 affixed to and built into the vertical members 12, 14, 16 to hold the sheet 18 therebetween and vertical, it is not the only means for securing contemplated by the principles of the present invention. Other attachment provisions, such as VELCRO™ hooks and loops connectors, adhesive, magnets, snaps, zippers or other releasable means are specifically contemplated such that their use in place of the rubber gripping fingers 34, 36 to hold the sheet 18 to the vertical members 12, 14, 16 does not depart from the principles of the present invention.

In the preferred embodiment illustrated in FIG. 1, brackets 24, 26, 28 comprise means for holding the sheet 18 in a substantially vertical orientation by attaching the frame comprising the vertical members 12, 14, 16, and the absorbent fabric sheet 18 affixed thereto, to the litterbox 30. Each bracket 24, 26, 28 comprises clamping means for holding the brackets 24, 26, 28 to the litterbox 30. Specifically, the brackets 24, 26, 28 comprise a clamp 48 with a spring-loaded hook 49 which engages the top of the litterbox 30 to hold the entire collector device 10 securely vertical and in place. In the most preferred embodiment, the clamp 48 and brackets 24, 26, 28 are formed from hard plastic which allows the clamp 48 to be spread open slightly and placed on the edges of the litterbox 30. The mechanical memory of the clamp 48 causes it to adhere tightly to the litterbox 30. Other embodiments incorporating other spring loading techniques or adjustability to tighten down clamps on the litterbox are specifically contemplated and do not depart from the principles of the present invention. In addition, the brackets 24, 26, 28 each comprise a means for receiving the vertical members 12, 14, 16 comprising a sleeve 50 sized to receive and retain the vertical members 12, 14, 16.

A second preferred embodiment of the present invention is shown in FIG. 4. The vertical pet excrement collector device 100 comprises a horizontal base 101 and a horizontal pad 102 as well as a vertical pad 104, further comprising an absorbent fabric sheet 105 stretched across and secured to a frame 107. The portion of the frame 107 to which the vertical pad 104 is secured comprises interconnected vertical members 106, 108 and a top member 110.

The horizontal pad 102 is secured to four horizontal members 114, 116, 118, 120, by pushing the pad 102 down into the gripping finger provisions built into the members 114, 116, 118 along gather lines 115, 117, 119. Similarly, the vertical pad 104 is secured to the vertical members 106, 108, 110 by pushing the pad 104 down into the gripping finger provisions built into the members 106, 108, 110 along gather lines 109, 111, 113. The horizontal members 114, 116, 118, 120 are secured to each other, and define a rigid rectangular horizontal frame 121, through the use of two corner connectors 122, 124 and three corner connectors 130, 132. Each of the two corner connectors 122, 124 has the typical construction depicted in FIG. 5, specifically two perpendicularly related sleeves 126, 128 sized to receive horizontal members 114, 116, 118. In the preferred embodiment of the invention depicted in FIG. 4, each of horizontal and vertical members 106, 108, 110, 114, 116, 118 comprising the frame 107 are of tubular cross section and have the C-shaped cross section and means for gripping as depicted in FIG. 2. Specifically, each frame member 106, 108, 110, 114, 116, 118 is substantially of tubular construction and has a C-shaped cross section 32 with a gap 33 formed between two edges 38, 40 of the C-shaped cross section 32. In this preferred embodiment, opposed rubber fingers 34, 36 are affixed to the two edges 38, 40 and cooperate to pinch the sheet 18 between them and hold it in place in the frame member. The rubber fingers 34, 36 are resilient and provide a releasable gripping means securing the sheet 18 to the frame members. While the preferred embodiment reflected in FIG. 2 illustrates the use of the resilient rubber gripping fingers 34, 36 affixed to and built into the frame member to hold the sheet therebetween, it is not the only means for securing contemplated by the principles of the present invention. Other attachment provisions, such as VELCRO™ hooks and loops connectors, adhesive, magnets, snaps, zippers or other releasable means are specifically contemplated such that their use in place of the rubber gripping fingers 34, 36 to hold the sheet to the frame member does not depart from the principles of the present invention.

Figures 5, 6:
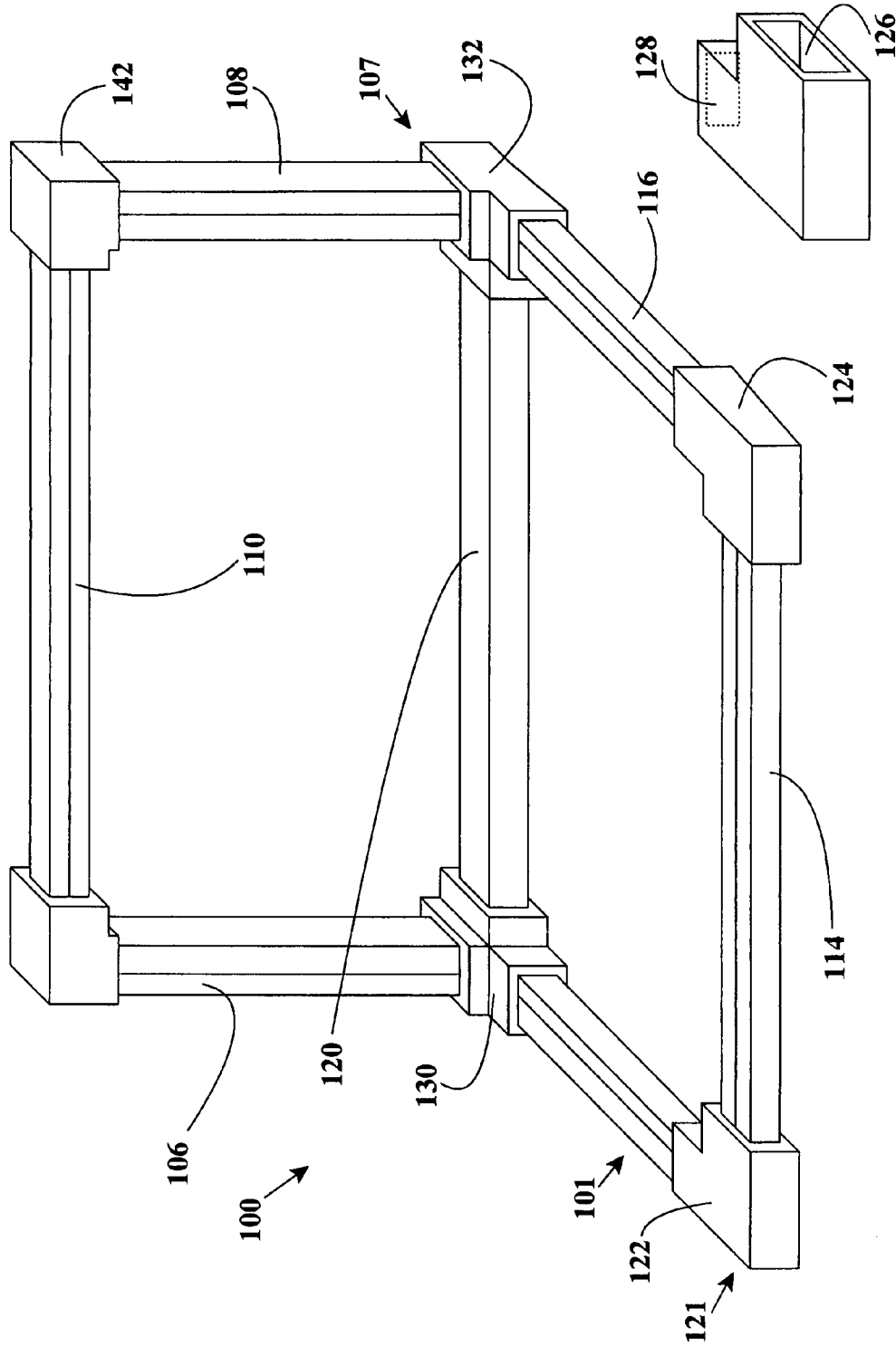
FIG. 5 is the frame having horizontal and vertical members without the horizontal and vertical collector sheets attached.
FIG. 6 is a detail view of the two member corner connectors of the frame.
Figure 7:
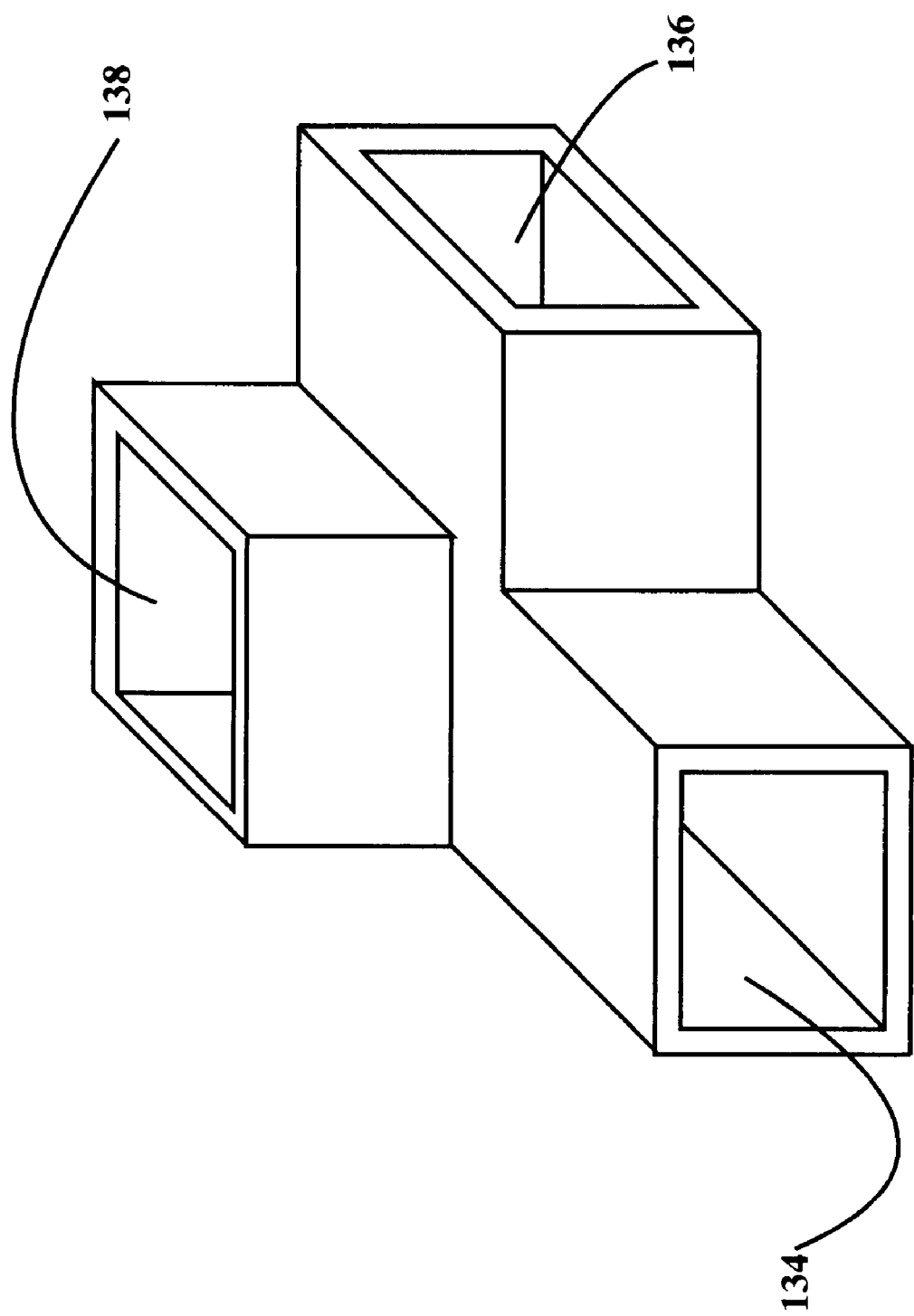
FIG. 7 is a detail view of the three member corner connectors of the frame.

The rear and vertical portions of the frame 107 are held rigid by the three corner connectors 130, 132 which are of the typical construction depicted in FIG. 6. Specifically, each corner connector 130, 132 comprises three orthogonally related sleeves 134, 136, 138 receiving the horizontal members 116, 118, 120 and vertical members 106, 108 as shown in FIG. 4. The remainder of the vertical portion of the frame 107 comprises upper corner connectors 140, 142 each being constructed consistent with the detail depicted in FIG. 5, specifically having two perpendicularly related sleeves 126, 128 to receive vertical members 106, 108 and the upper bridge member 110. Each of the members 114, 116, 118, 120, 106, 108, 110 comprising the frame 107 are represented by the detail depicted in FIG. 2. Specifically, all comprise a C-shaped cross section 32 with opposed rubber gripping fingers 34, 36 built into the members in the gap 33, the rubber gripping fingers 34, 36 extending from the two edges 38, 40.

The frame 100 to which the horizontal pad 102 and vertical pad 104 are secured provides a device that is not only a horizontal excrement catcher, but also catches other urination and defecation and would not otherwise land on the horizontal pad, such as that of a male dog that raises his leg or a cat that "sprays". The horizontal pad 102 and vertical pad 104 may be constructed from a single, double wide section of absorbent fabric which may quickly and conveniently be discarded by simply pulling it out from the gripping fingers built into the frame members 106, 108, 110, 114, 116, 118.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A vertical pet excrement collection device comprising:
    a collecting sheet comprising absorbent fabric;
    a frame comprising orthogonally interconnected horizontal and vertical members, said frame holding said collecting sheet in a substantially vertical and horizontal orientation;
    means for releasably securing said collecting sheet to said frame, said securing means comprising opposed rubber gripping fingers pinching said collecting sheet therebetween and holding said sheet in place in said vertical and horizontal members.

2. The device set forth in claim 1 wherein said means for securing further comprises resilient rubber gripping fingers affixed to said members.

3. The device set forth in claim 2 wherein said members are of tubular construction.

4. The device set forth in claim 3, each of said members comprising a substantially C-shaped cross section having a gap formed therein.

5. The device set forth in claim 4 wherein said resilient rubber gripping fingers are affixed to two edges forming said gap and hold said collecting sheet there between.

6. The device set forth in claim 1 wherein said horizontal and vertical members are of tubular construction.

7. The device set forth in claim 6 wherein said horizontal and vertical members of tubular construction comprise substantially C-shaped cross sections.

* * * * *